(12) United States Patent

Ghezal et al.

(10) Patent No.: US 12,583,626 B2

(45) Date of Patent: *Mar. 24, 2026

(54) METHOD FOR ACQUIRING IMAGES OF A TERRESTRIAL ZONE USING A SPACECRAFT COMPRISING A LASER TRANSMISSION MODULE

(71) Applicant: AIRBUS DEFENCE AND SPACE SAS, Toulouse Cedex (FR)

(72) Inventors: Mehdi Ghezal, Toulouse Cedex (FR); Emmanuel Giraud, Toulouse Cedex (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 169 days.

This patent is subject to a terminal disclaimer.

(21) Appl. No.: 18/690,082

(22) PCT Filed: Sep. 5, 2022

(86) PCT No.: PCT/FR2022/051668

§ 371 (c)(1),
(2) Date: Mar. 7, 2024

(87) PCT Pub. No.: WO2023/037066

PCT Pub. Date: Mar. 16, 2023

(65) Prior Publication Data

US 2024/0383619 A1 Nov. 21, 2024

(30) Foreign Application Priority Data

Sep. 8, 2021 (FR) ...................................... 21 09390

(51) Int. Cl.
*B64G 1/10* (2006.01)
*H04B 10/118* (2013.01)

(52) U.S. Cl.
CPC .......... *B64G 1/1028* (2023.08); *H04B 10/118* (2013.01)

(58) Field of Classification Search
CPC .. B41G 1/1028; B41G 1/1021; H04B 10/118; G01C 11/02; G01C 11/025; G03B 15/006; G03B 30/00
See application file for complete search history.

(56) References Cited

U.S. PATENT DOCUMENTS 11,802,766 B2 * 10/2023 Ghezal ................... B64G 1/244
12,126,380 B2 * 10/2024 Ghezal ................. H04B 10/503
(Continued)

FOREIGN PATENT DOCUMENTS

| EP | 2 247 505 A0 | 11/2010 |
| WO | 2009101006 A1 | 8/2009 |
| WO | 2018073507 A1 | 4/2018 |

OTHER PUBLICATIONS

Fouquet et al., "UOSAT-12 Minisatellite for High Performance Earth Observation at Low Cost", Acta Astronautica, vol. 41, No. 3, pp. 173-182, Apr. 1997.

(Continued)

*Primary Examiner* — Christopher E Mahoney
(74) *Attorney, Agent, or Firm* — Nixon & Vanderhye, PC

(57) ABSTRACT

A method for acquiring images by a spacecraft is disclosed having an observation instrument and a laser transmission module, the method including a phase of acquiring an image of the surface of the Earth and a phase of transmitting images using the laser transmission module, and during each acquisition phase and each transmission phase, the attitude control includes: a pointing modification step during which the attitude of the spacecraft is modified so as to orient the satellite towards a predetermined setpoint, a pointing immobilization step during which the attitude of the spacecraft is (Continued)

controlled for a time interval referred to as an immobilization period so as to keep the spacecraft oriented towards the setpoint.

13 Claims, 6 Drawing Sheets

(56) References Cited

U.S. PATENT DOCUMENTS

| | | | |
|---|---|---|---|
| 2019/0033891 A1* | 1/2019 | Giraud | B64G 1/1085 |
| 2019/0084698 A1 | 3/2019 | Leatham et al. | |
| 2019/0337643 A1* | 11/2019 | Giraud | H04B 7/18513 |

OTHER PUBLICATIONS

Lavezzi et al., "Attitude Control Strategies for an Imaging CubeSat", IEEE, pp. 149-155, May 2019.

Intention to grant a European Patent with English translation for Application No. EP 22 782 914.0, 60 pages, dated Aug. 1, 2024.

Xiaojiang Chen et al., "Ground-Target Tracking Control of Earth-Pointing Satellites", AIAA Guidance, Navigation, and Control Conference and Exhibit, American Institute of Aeronautics and Astronautics, Reston, Virginia, Aug. 14, 2000, pp. 1-11, retrieved from the internet: <https://arc.aiaa.org/doi/10.2514/6.2000-4547>.

Shinya Fujita et al., "Attitude Maneuvering Sequence Design of High-Precision Ground Target Tracking Control for Multispectral Earth Observations", Proceedings of the 2019 IEEE/SICE International Symposium on System Integration, Paris, France, Jan. 14-16, 2019, pp. 153-158.

Yosuke Kondo et al., "Study of Ground Point Tracking of Earth Observation Satellites", Transactions of the Japan Society for Aeronautical and Space Sciences, vol. 52, No. 600, Jan. 1, 2004, pp. 23-29, retrieved from the internet: <https://www.jstage.jst.go.jp/article/jjsass/52/600/52_600_23/_pdf/-char/ja>.

International Preliminary Report on Patentability for PCT/FR2022/051668, dated Sep. 6, 2023, 9 pages.

International Search Report with English Translation for PCT/FR2022/051668, mailed Dec. 23, 2022, 7 pages.

Written Opinion of the ISA for PCT/FR2022/051668, mailed Dec. 23, 2022, 8 pages.

* cited by examiner

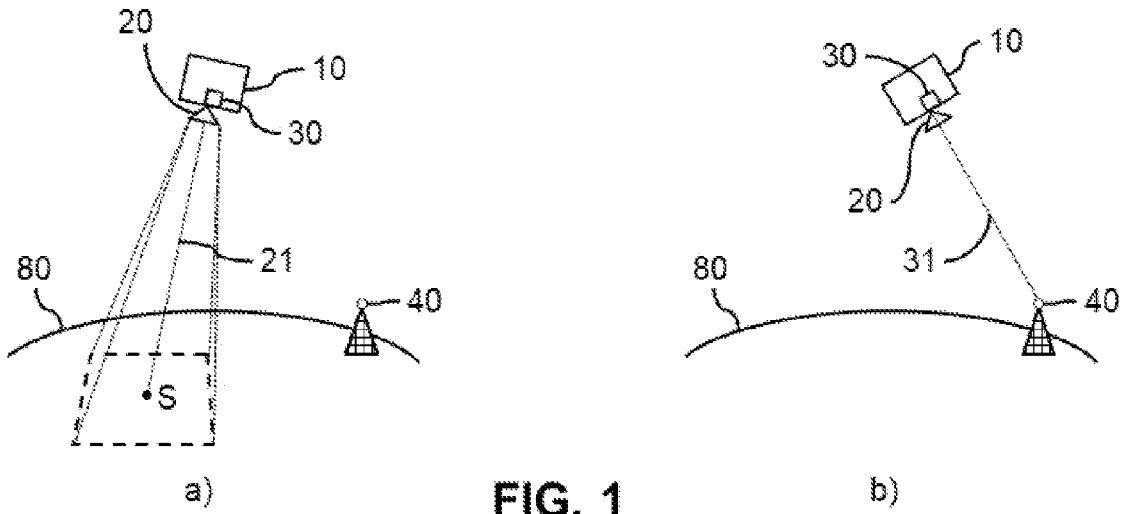
a)                FIG. 1                b)
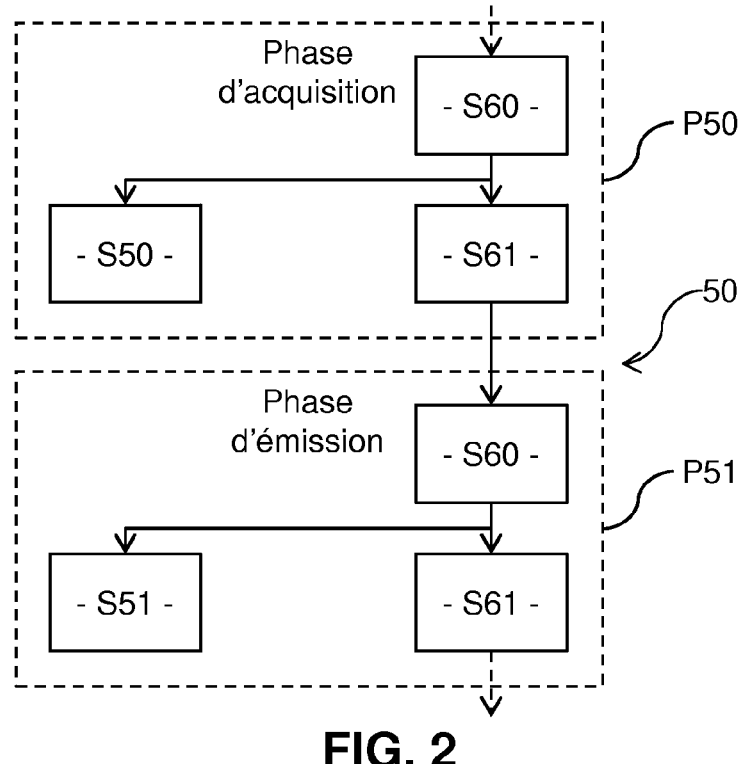
FIG. 2

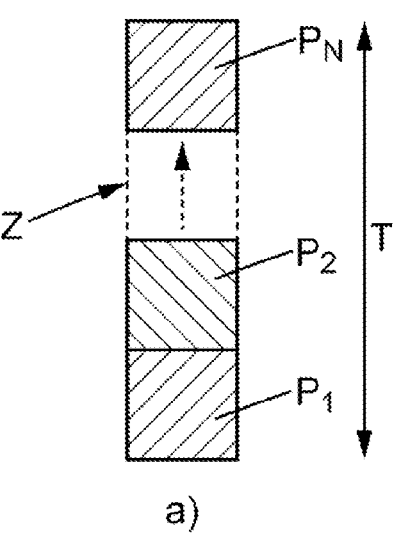
a)
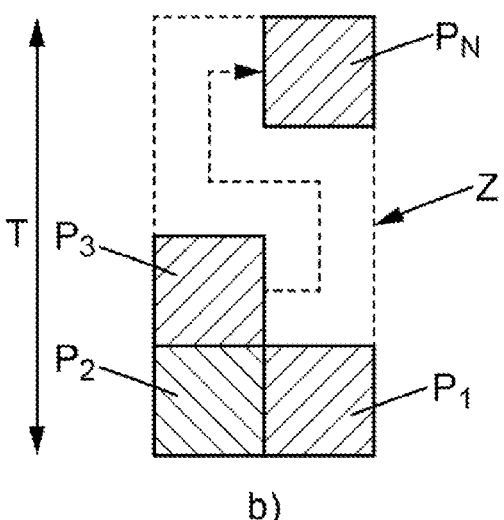
b)
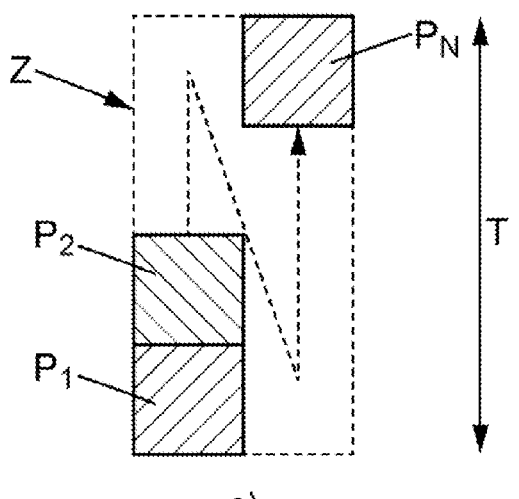
c)
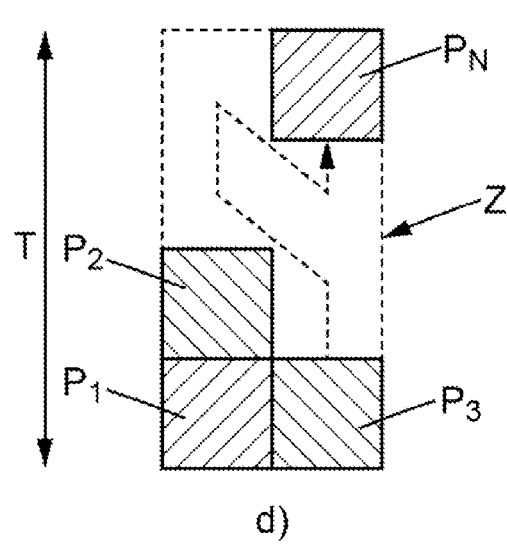
d)
FIG. 5
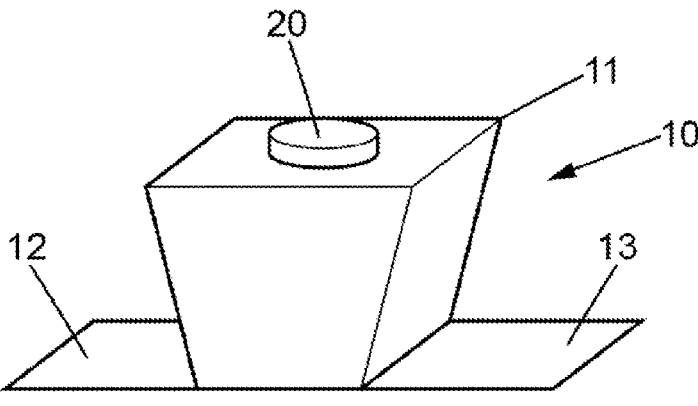
FIG. 6

METHOD FOR ACQUIRING IMAGES OF A TERRESTRIAL ZONE USING A SPACECRAFT COMPRISING A LASER TRANSMISSION MODULE

CROSS REFERENCE TO RELATED APPLICATIONS

The present application is a National Phase of International Application Number PCT/EP2022/051668 filed Sep. 5, 2022, which designated the U.S. and claims priority benefits from French Application No. FR 2109390, filed Sep. 8, 2021, the entire contents of each of which are hereby incorporated by reference.

FIELD OF DISCLOSURE

This invention belongs to the field of terrestrial imaging by spacecraft, such as observation satellites, and more particularly relates to a method for acquiring images of a terrestrial area by using a spacecraft in moving orbit, as well as to a spacecraft for implementing such an acquisition method.

BACKGROUND

Terrestrial observation missions carried out by a spacecraft consist of acquiring images of portions of the Earth's surface, i.e. capturing pictures of it. Such acquisitions are, for example, carried out in response to customer requests, and serve as a basis for the production of final composite images.

Conventionally, such a spacecraft follows a moving orbit around the Earth in order to acquire images during its flight over the Earth's surface. For this purpose, it comprises an observation instrument associated with a predetermined spatial resolution as well as an optical line of sight. In a known manner, such an optical line of sight forms the outgoing portion of the optical path of the observation instrument, and points towards the Earth's surface during image acquisitions.

In addition, the observation instrument is configured to have a field of view for which the projection on the ground at nadir has a predetermined length along the spacecraft's direction of travel. In a manner that is known per se, the characteristics of this field of view depend on the component optical elements and detectors of the observation instrument, as well as on their respective arrangements and positions. It is therefore understood that this length determines, at least in part, the dimensions of the acquisitions made by the observation instrument along the direction of travel.

When observing a terrestrial area extending over a distance greater than said predetermined length associated with the observation instrument, the acquisition method generally implemented is the one known by the name "pushbroom".

However, the advancing movement of the spacecraft impacts the ability of the observation instrument to make sharp and precise acquisitions. Acquiring images that are free of blurring (also known as "motion blur") is problematic, all the more so when the desired resolution is high. One solution to limit blurring consists of reducing the acquisition time, i.e. to take rapid shots. However, in order to operate at high frequency, the observation instrument requires complex and therefore expensive electronics. In addition, a short acquisition time has an unfavorable impact on the signal-to-noise ratio (SNR) of the acquisitions. The implementation of TDI configurations (acronym for "Time Delay and Integration") makes it possible to reduce this deficiency, at the cost of greater electronic complexity.

In addition, due to the growing demand for image acquisition, it must be possible to acquire numerous images and transfer them to the ground during the same orbital period. To enable the rapid transfer of a large amount of data to the ground, one conceivable possibility is to equip the spacecraft with a laser transmission module for transferring these data via a laser link. However, using a laser transmission module to transfer data to the ground also increases the complexity of the spacecraft as well as its control.

Patent application WO 2018/073507 proposes an observation instrument operating in "pushbroom" mode, comprising a line sensor and a laser transmission module both located in a focal plane of the optics of the observation instrument. Such arrangements are advantageous, since they make it possible to reduce the amount of equipment to be carried on board the spacecraft because the same optics are used by both the line sensor and the laser transmission module.

However, the solution proposed by patent application WO 2018/073507 remains complex, particularly from the point of view of controlling the spacecraft during image acquisitions and data transfers.

SUMMARY OF THE DISCLOSURE

The present invention aims to remedy some or all of the disadvantages of the prior art, in particular those set forth above, by proposing a solution which allows acquiring images of excellent image quality of a terrestrial area by using a spacecraft in moving orbit, while enabling the acquired images to be transferred to the ground via a laser link and while reducing the overall complexity of the spacecraft.

Furthermore, this invention aims to make it possible, in at least certain embodiments, to acquire images of excellent image quality while maintaining a good capacity for image acquisition.

For this purpose, and according to a first aspect, a method for acquiring images by using a spacecraft is proposed, said spacecraft being in a moving orbit around the Earth, the spacecraft comprising:

an observation instrument associated with a field of view that is fixed in the spacecraft frame of reference, said field of view being defined, around an optical line of sight, by an sensor array located in a focal plane of the optics of the observation instrument, a laser transmission module associated with a laser line of sight that is fixed in the spacecraft frame of reference, said laser transmission module being located in the focal plane or in a secondary focal plane of the optics or in an intermediate focal plane of part of the optics, the laser transmission module being adapted to transmit data comprising images acquired by the sensor array of the observation instrument, to a laser reception module.

The acquisition method comprises one or more phases of image acquisition by the sensor array of the observation instrument, and a phase of data transmission by the laser transmission module, said transmitted data comprising one or more images acquired by the sensor array of the observation instrument. During each acquisition phase and each transmission phase, the attitude of the spacecraft is controlled according to a setpoint on the Earth's surface that was predetermined for the acquisition or transmission phase in progress, said attitude control comprising:

a pointing modification step during which the attitude of the spacecraft is modified so as to orient the optical line of sight or the laser line of sight towards the setpoint, a pointing immobilization step during a time interval referred to as the immobilization period, during which the attitude of the spacecraft is controlled so that the optical line of sight or the laser line of sight is kept oriented towards said setpoint during the immobilization period.

The spacecraft thus comprises an observation instrument and a laser transmission module in which the field of view and the laser line of sight are both fixed in the spacecraft frame of reference. The observation instrument comprises a sensor array, meaning a sensor comprising a plurality of rows and a plurality of acquisition cells, located in a focal plane of the optics of the observation instrument. The laser transmission module is for example located in the focal plane of the optics as is the sensor array, or in a secondary focal plane obtained by duplication of the focal plane so that the focal plane and the secondary focal plane optically overlap. The laser transmission module may also be located in an intermediate focal plane corresponding to part of the optics of the observation instrument. For example, if the observation instrument has Korsch-type optics, the intermediate focal plane can correspond to the focal plane of the associated Cassegrain.

The proposed solution is therefore simple in terms of equipment to be carried on board the spacecraft and be controlled, given that it is not necessary to equip the spacecraft with:

equipment for moving the optical and laser lines of sight within the spacecraft frame of reference, and dedicated optics for the laser transmission module, since it uses the optics of the observation instrument.

In addition, any pointing errors are then the same for both the sensor array and the laser transmission module, so they are easier to estimate and correct.

To move the point targeted by the optical line of sight of the observation instrument or the point targeted by the laser line of sight of the laser transmission module, beyond the natural movement linked to the advancement of the spacecraft in its moving orbit, it is therefore necessary to control the attitude of the spacecraft in order to modify where the spacecraft is pointing.

In order to limit the complexity of the pointing control, the attitude of the spacecraft is controlled, during an acquisition phase or a transmission phase, according to a predetermined setpoint on the Earth's surface. From this predetermined setpoint, the attitude control comprises two successive steps which are executed independently of the type of phase concerned, acquisition or transmission. These steps first include a step during which the attitude of the spacecraft is modified so as to orient a line of sight (optical or laser) towards the setpoint, followed by a step during which the attitude of the spacecraft is controlled so as to keep the line of sight (optical or laser) oriented towards the setpoint. Thus, the attitude control makes it possible to immobilize the point targeted by the line of sight concerned, optical or laser, on the Earth's surface. Such attitude control therefore allows keeping the laser transmission module pointed towards a laser reception module during a data transmission phase, and to acquire an image without blurring during an acquisition phase, with an SNR which may be improved in comparison to prior art solutions.

It should be noted that the pointing control performed during these two stages of pointing modification and pointing immobilization is essentially a two-axis attitude control:

controlling the rotational attitude of the spacecraft around the line of sight is not considered in these two steps. The attitude of the spacecraft is, however, well-controlled along three axes. In particular, during each acquisition phase and simultaneously with the pointing immobilization step, the attitude of the spacecraft is also controlled to keep the ground footprint of the field of view of the observation instrument rotationally immobilized around the setpoint, for the duration of the immobilization period.

Despite this pointing immobilization, because the observation instrument comprises a sensor array, each acquired image represents the equivalent of a plurality of line images as acquired by a line sensor in the case of "pushbroom" mode. It is therefore possible to maintain a good capacity for image acquisition, i.e. to maintain the capacity to image a significant surface area of the Earth, by increasing the number of acquisition cells of the sensor array along the direction of travel. For example, it is possible to consider a number of acquisition cells greater than 1000, or even greater than 5000 along the direction of travel.

In "pushbroom" mode, it is necessary to send to the spacecraft precise commands for the attitude control actuators, for the purposes of the attitude maneuvers and successive acquisitions of line images. In particular, each image acquisition in TDI "pushbroom" mode requires precise control of the spacecraft in order to have good spatial registration for the various TDI stages. It is therefore necessary to define a detailed attitude guidance profile for the attitude maneuvers, the image acquisition, and the transition between the two. Determining such commands is complex and generally cannot be carried out on board the spacecraft due to lack of sufficient onboard computing power. It is therefore necessary to generate these commands in advance on the ground and transmit them to the spacecraft via a high-speed link, which is only possible when the spacecraft is visible to a ground station having a high-speed link (generally once per orbit).

Due to the image acquisition by sensor array and the pointing immobilization during the acquisition phases, programming the spacecraft can be done very simply, by sending the coordinates of the setpoints respectively associated with the portions of the Earth's surface where images are to be acquired. These setpoints can be sent directly on board, because the image acquisition phase only requires very simple guidance, essentially to compensate for the travel of the spacecraft. Thus, the attitude maneuver guidance profile and the image acquisition can be calculated quite simply on board, from the coordinates (for example latitude and longitude) of the setpoint for the previous image acquisition or transmission phase and from the coordinates of the setpoint for the next acquisition or transmission phase. Optionally, time information (for example date and/or immobilization period) and/or altitude information for the setpoint may also be transmitted. Such information can be sent via a very low-speed link so that it is sufficient to have visibility with a low-speed ground station. Such low-speed ground stations use technically simple and inexpensive means, well known to those skilled in the art, and can therefore be provided in greater numbers than high-speed ground stations, so that a very low-speed link can be available several times per orbit.

A transmission phase may also be treated in the same manner as an acquisition phase, by sending the spacecraft the coordinates (setpoint) of the laser reception module to be used. Programming the transmission phases can therefore be carried out at the same time as programming the acquisition phases, and with the same type of information. Given that this information can be transmitted to the satellite 10 on a very low-speed link that is available several times per orbit, programming can be carried out much more dynamically than in the prior art, shortly before the transmission phase concerned. For example, as a laser link is strongly dependent on weather conditions (clouds), it is possible to choose, late in the process, the laser which has the most favorable weather conditions among several possible laser reception modules.

In some particular modes of implementation, the acquisition method may optionally further comprise one or more of the following features, in isolation or in all technically possible combinations.

In some particular modes of implementation, the spacecraft having a ground speed $V_{sol}$ and the observation instrument being associated with a spatial resolution $R_s$ along the direction of travel, the immobilization period is greater than $R_s/V_{sol}$ for each acquisition phase.

Such arrangements make it possible to improve the SNR of the image. Preferably, the immobilization period during each acquisition phase is significantly greater than $R_s/V_{sol}$ (by a factor of 100 or even 1000). Preferably, the image acquisition period, included within the immobilization period of an acquisition phase, is also greater than $R_s/V_{sol}$, even significantly greater than $R_s/V_{sol}$ (by a factor of 100 or even 1000).

In some particular modes of implementation, the ground footprint of the field of view being of length L along the direction of travel, the acquisition method comprises at least two successive image acquisition phases for two parts $P_1$ and $P_2$ of a terrestrial area Z, and the pointing modification step of the image acquisition phase for part $P_2$ is executed during a time interval of duration $\beta$ such that the value $V_{sol}·(\alpha+\beta)·1/L$ is less than a value R, R being equal to 3 (R=3), or equal to 2.3 (R=2.3), $\alpha$ being the immobilization period of the acquisition phase for part $P_1$. For example, said two parts $P_1$ and $P_2$ are contiguous or at most partially overlap along the direction of travel. Said parts $P_1$ and $P_2$ may also be disjoint.

Length L corresponds to the length of the ground footprint along the direction of travel of the spacecraft. For a given circular orbit, the length of the ground footprint varies with the incidence of the optical line of sight on the Earth's surface, and is minimal when the incidence is normal to said Earth's surface (nadir pointing). Length L corresponds to the minimum length of the ground footprint, meaning the length of the footprint at normal incidence (nadir pointing). However, it is obviously possible to use oblique pointing during the acquisitions and the invention is not limited to the use of nadir pointing. Length L at normal incidence is considered as a reference length because, if the inequality $V_{sol}·(\alpha+\beta)·1/L<R$ is satisfied, the inequality $V_{sol}·(\alpha+\beta)·1/L_{obl}<R$ is also satisfied, $L_{obl}$ being the length of the ground footprint during oblique pointing. It should also be noted that the invention is not limited to the use of a circular orbit, and is also applicable to an elliptical orbit. In this case, the reference (minimum) length L corresponds to the length of the ground footprint at normal incidence when the spacecraft is at perigee in the elliptical orbit. In addition, the ground speed $V_{sol}$ considered as the reference (maximum) ground speed corresponds to the ground speed when the satellite is at perigee in the elliptical orbit.

Preferably, nadir pointing is used since it gives the maximum resolution, but nothing prevents using oblique pointing along the direction of travel (forward or back) and/or transversely to said direction of travel (left or right). Oblique pointing can be used in particular to acquire stereo images.

By means of such arrangements, the delay taken to acquire the image of part $P_1$, in relation to the advancement of the spacecraft and due to immobilization of the ground footprint, is reduced and partly compensated for by a relatively rapid pitch maneuver. Thus, during a single flight over the terrestrial area Z, it is possible to acquire several successive portions along the direction of travel of the spacecraft, with little delay, and therefore to acquire strips of long length along said direction of travel of the spacecraft. For a given orbit and for a predetermined immobilization period $\alpha$, the main parameters ensuring that the value $V_{sol}·(\alpha+\beta)·1/L$ is less than R are as follows:

duration $\beta$ of the pointing modification,
length L of the footprint.

The value $V_{sol}·(\alpha+\beta)·1/L$ decreases as duration $\beta$ decreases. To reduce duration $\beta$, it is possible to increase the ratio $C_t/I_t$ between the pitch torque formation capacity $C_t$ of the spacecraft and the pitch inertia $I_t$ of said spacecraft. Indeed, it is possible to demonstrate that duration $\beta$ satisfies the following expression:

$$\beta \geq \sqrt{\frac{4·I_t·\theta}{C_t}} \qquad \text{[Math. 1]}$$

an expression in which $\theta$ corresponds to the variation in pitch attitude achieved during the pointing modification step.

The value $V_{sol}·(\alpha+\beta)·1/L$ decreases as length L increases. To increase length L, it is for example possible to increase the number $N_p$ of acquisition cells (pixels) of the sensor array along the direction of travel.

To ensure that the value $V_{sol}·(\alpha+\beta)·1/L$ is less than R, the ratio $C_t/I_t$ and the length L (for example the number $N_p$) will be greater than the ratios $C_t/I_t$ and/or the lengths L generally considered in the solutions of the prior art.

Preferably, all the image acquisition phases for parts of the terrestrial area Z which are executed successively (not separated by a transmission phase) are such that the immobilization period $\alpha$ of the immobilization step of a given acquisition phase and the duration $\beta$ of the pointing modification step (at least for a pitch attitude modification) of the next acquisition phase satisfy $V_{sol}·(\alpha+\beta)·1/L<R$. However, this can obviously be adapted according to requirements, and it is not necessary to quickly change the spacecraft pointing if there are few images to acquire within the terrestrial area Z.

In some particular modes of implementation, the acquisition method comprises, during a same orbital period, at least two image acquisition phases for a same part $P_1$ of a terrestrial area. Such arrangements make it possible to obtain (multi) stereo images of said same part $P_1$, which are acquired by the same spacecraft during the same flight over the terrestrial area considered (same orbital period) by said spacecraft. For example, these at least two image acquisition phases for the same part $P_1$ of the terrestrial area are executed successively, one after the other, or are separated by one or more image acquisition phases for other parts of the terrestrial area and/or by one or more transmission phases. In the case where one or more image acquisition phases for other parts are interposed between the at least two image acquisition phases for the same part $P_1$, the pointing modification step of each image acquisition phase is preferably executed during a time interval of duration $\beta$ such that the value $V_{sol}·(\alpha+\beta)·1/L$ is less than a value R, R being equal to 3 (R=3), or equal to 2.3 (R=2.3), α being the immobilization period of the previous acquisition phase.

In some particular modes of implementation, the terrestrial area Z comprises at least one strip of a length greater than 10 km, obtained by acquiring images of at least three parts arranged in the extension of one another along the direction of travel of the spacecraft, the adjacent parts along the direction of travel being contiguous or at most partially overlapping along the direction of travel.

In some particular modes of implementation, the immobilization period a is between 200 ms and 1s.

In some particular modes of implementation, the duration β is between 1 s and 2 s.

In some particular modes of implementation, each pointing immobilization step comprises stabilizing the pointing of the spacecraft prior to acquiring an image or transmitting one or more acquired images.

In some particular modes of implementation, the stabilization period, included in the immobilization period, is between 100 ms and 800 ms.

In some particular modes of implementation, the acquisition method comprises a phase of using the sensor array to acquire an image of a calibration area, referred to as a calibration image, and calibrating the pointing error by comparing the calibration image with reference data associated with said calibration area.

Indeed, given that here the image sensor is a sensor array, it can be used to acquire a calibration image of a predetermined calibration area for which reference data is available. For example, if the optical line of sight is oriented towards a setpoint of the calibration area during acquisition of the calibration image, the reference data correspond for example to a reference image of the calibration area which represents the image that should be obtained in the absence of any pointing error in the optical line of sight. By comparing the calibration image with the reference image, it is possible to estimate a possible pointing error, which can then be compensated for during the phases of acquiring images to be transmitted and during the phases of transmitting said acquired images. The calibration image, used to estimate the pointing errors, is therefore acquired by the same sensor array as is used to acquire the images which are then transmitted over the laser link by the laser transmission module. Other reference data may additionally or alternatively be considered. For example, these may be the theoretical coordinates in the calibration image of a characteristic element located in the calibration area and detectable in the calibration image, in the absence of any pointing error. By comparing the actual coordinates of the characteristic element in the calibration image with its theoretical coordinates, it is possible to estimate the possible pointing error, etc.

In some particular modes of implementation:

the setpoint of an acquisition phase is such that the ground footprint of the field of view of the observation instrument coincides with a part for which an image is to be acquired (possibly after rotation of the footprint around the optical line of sight), the setpoint of a transmission phase corresponds to the position of a laser reception module.

According to a second aspect, a spacecraft is proposed that is intended to be placed in a moving orbit around the Earth, comprising:

attitude control means for the spacecraft, an observation instrument associated with a field of view that is fixed in the spacecraft frame of reference, said field of view being defined, around an optical line of sight, by a sensor array located in a focal plane of optics of the observation instrument, a laser transmission module associated with a laser line of sight that is fixed in the spacecraft frame of reference, said laser transmission module being located in the focal plane or in a secondary focal plane of the optics or in an intermediate focal plane of part of the optics, means configured to implement an method for image acquisition according to any one of the modes of implementation of this invention.

In some particular embodiments, the spacecraft may optionally further comprise one or more of the following features, individually or in all technically possible combinations.

In some particular embodiments, the spacecraft having a pitch inertia $I_t$ and the attitude control means having a pitch torque formation capacity $C_t$, the ratio $C_t/I_t$ is greater than $0.01$ s$^{-2}$. For example, capacity $C_t$ is greater than 0.8 N·m.

In some particular embodiments, the spacecraft having a roll inertia $I_r$ and the attitude control means having a roll torque formation capacity $C_r$, the ratio $C_r/I_r$ is greater than $0.01$ s$^{-2}$. For example, capacity $C_r$ is greater than 0.8 N·m.

In some particular embodiments, the sensor array comprises a number $N_p$ that is greater than 1000, of acquisition cells along the direction of travel.

In some particular embodiments, the attitude control means comprise at least one reaction wheel which recovers electrical energy and/or at least one control moment gyroscope.

In some particular embodiments, the optics comprise at least two mirrors that are fixed in the spacecraft frame of reference, and the laser transmission module transmits laser radiation along the laser line of sight via at least two mirrors of the optics.

In some particular embodiments, the observation instrument comprises Korsch optics.

According to a third aspect, this invention relates to a method for acquiring images of a terrestrial area Z by using a spacecraft, said spacecraft being in a moving orbit around the Earth along a direction of travel and with a ground speed $V_{sol}$, said spacecraft comprising an observation instrument associated with a field of view that is fixed in the spacecraft frame of reference and forming a ground footprint of length L along the direction of travel, said field of view being defined, around an optical line of sight, by a sensor array located in a focal plane of the optics of the observation instrument. This acquisition method comprises an image acquisition phase for a part Pi and an image acquisition phase for a part $P_2$ of the terrestrial area Z, said parts $P_1$ and $P_2$ being disjoint, and wherein:

the image acquisition phase for part $P_1$ comprises a pointing immobilization step during a time interval of duration α, during which the attitude of the spacecraft is controlled so that the optical line of sight is kept oriented towards a first stationary setpoint on the Earth's surface for duration α, the first setpoint being such that the ground footprint corresponds to part $P_1$ when the optical line of sight is pointed towards said first setpoint, the image acquisition phase for part $P_2$ comprises a pointing modification step during which the attitude of the spacecraft is controlled so that the optical line of sight is oriented towards a second stationary setpoint on the Earth's surface, the second setpoint being such that the ground footprint corresponds to part $P_2$ when the optical line of sight is pointed towards the second setpoint, the pointing modification step of the image acquisition phase for part $P_2$ being executed during a time interval of duration $\beta$ such that the value $V_{sol} \cdot (\alpha + \beta) \cdot 1/L$ is less than a value R, R being equal to 3 (R=3), or equal to 2.3 (R=2.3), the image acquisition phase for part $P_2$ further comprises a pointing immobilization step during which the attitude of the spacecraft is controlled so that the optical line of sight is kept oriented towards the second stationary setpoint on the Earth's surface.

By means of such arrangements, and independently of the manner in which the acquired data is subsequently transmitted to the ground, the delay taken to acquire the image of part $P_1$, in relation to the advancement of the spacecraft and due to the immobilization of the ground footprint, is reduced and partly compensated for by a relatively rapid pitch and/or roll maneuver. Thus, during a single flight over the terrestrial area Z, it is possible to carry out several acquisitions in the terrestrial area Z, without blurring and with a good SNR (by adjusting the immobilization period $\alpha$).

Everything that has been described above concerning the advantages related to acquisition by a sensor array and programming via setpoints (in particular the fact that these setpoints can be sent on board via a low-speed link just before an image capture) also applies in the case of the acquisition method according to the third aspect.

In some particular modes of implementation, the acquisition method according to the third aspect may further comprise, during the same orbital period, another acquisition phase for another image of part $P_1$.

BRIEF DESCRIPTION OF THE DRAWINGS

The invention will be better understood by reading the following description, given by way of non-limiting example and made with reference to the figures which show:

FIG. 1: a schematic representation of a spacecraft in a moving orbit around the Earth, FIG. 2: a diagram illustrating the main steps of one mode of implementation of an acquisition method, FIG. 5: a schematic representation of examples of successive acquisitions of parts of a terrestrial area, FIG. 6: a schematic representation of a satellite for implementing an acquisition method.

In these figures, identical references from one figure to another designate identical or similar elements. For clarity, items are not shown to scale unless otherwise noted.

DETAILED DESCRIPTION OF THE EMBODIMENTS

Figure 3:
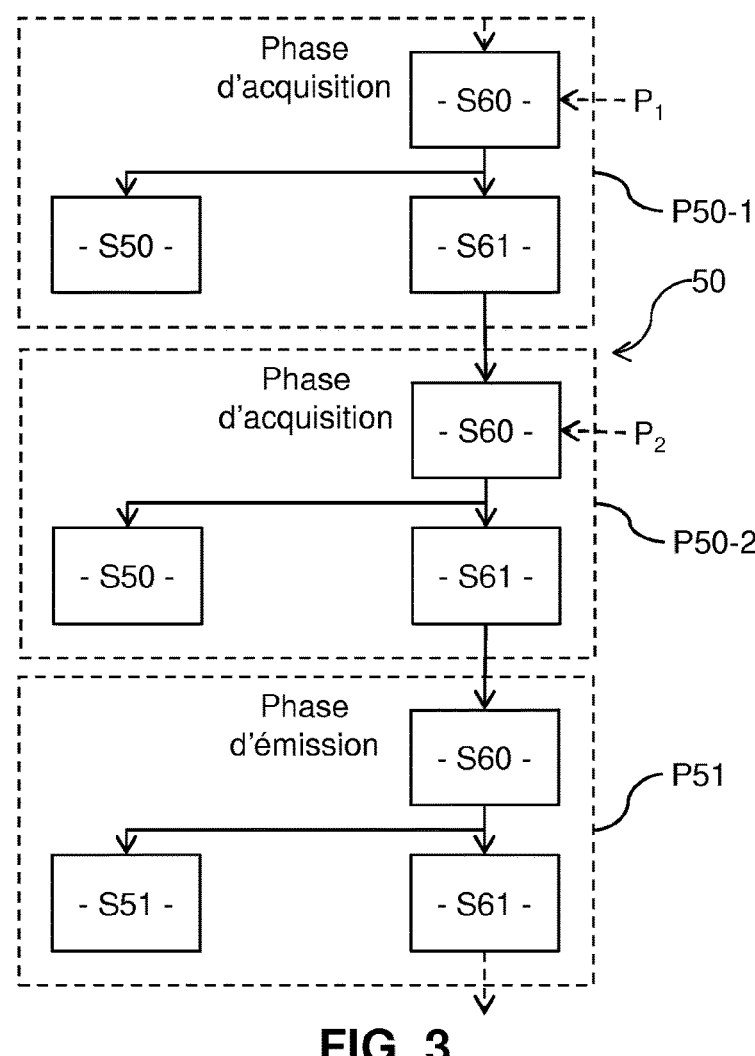
FIG. 3: a diagram illustrating the main steps of one mode of implementation of the acquisition method, comprising the acquisition of two successive images.

FIG. 1 schematically represents a spacecraft in moving orbit (i.e. a non-geostationary orbit) around the Earth 80. Preferably, the spacecraft is placed in a circular orbit, preferably at an altitude lower than 2000 km or even lower than 1000 km. However, in other examples, nothing excludes considering other types of orbits, notably elliptical orbits.

In the example illustrated in FIG. 1, the spacecraft is a satellite 10. However, nothing excludes, in other examples not described, considering other types of spacecraft (space shuttle, probe, etc.).

Satellite 10 moves in its circular orbit around Earth 80 with a ground speed $V_{sol}$. For example, satellite 10 travels in a circular orbit at an altitude substantially equal to 500 km, with a ground speed substantially equal to 7 km·s$^{-1}$.

Satellite 10 comprises an observation instrument 20 for acquiring images of parts of the surface of Earth 80.

"Acquisition" of part of the surface of Earth 80 refers here to the measurement, during a time interval of predetermined duration, of an optical flow received from said part of the surface of Earth 80 by observation instrument 20.

In a manner that is known per se, observation instrument 20 comprises acquisition means configured to capture the optical flow coming from the surface of Earth 80. In particular, observation instrument 20 comprises at least one sensor array 24 comprising a plurality of acquisition cells (pixels) organized in several rows and several columns. In this description, each row extends transversely to the direction of travel, while each column extends substantially along said direction of travel, but this is considered to be in no way limiting. Observation instrument 20 also comprises optics comprising one or more mirrors arranged to reflect the optical flow coming from the surface of Earth 80 towards sensor array 24, arranged in a focal plane PF of the optics of observation instrument 20.

Observation instrument 20 is associated with an optical line of sight 21. Optical line of sight 21 forms the outgoing part of the optical path of observation instrument 20 and meets the surface of Earth 80 at a point called the "ground point" S. By convention, optical line of sight 21 is defined as corresponding to the optical path starting from the center of sensor array 24. Optical line of sight 21 is fixed in the satellite frame of reference, meaning that the orientation of optical line of sight 21 relative to a body 11 of the satellite cannot be modified and by necessity follows the movement of satellite 10 when the attitude of satellite 10 is modified.

Observation instrument 20 is also associated with a field of view that is fixed in the satellite frame of reference. This fixed field of view corresponds to the angular aperture of observation instrument 20 and the acquisition cells of the sensor array. Also note that "fixed" refers here to the fact that optical line of sight 21 is fixed in the satellite frame of reference and in addition that the angular aperture is of invariable size. The field of view of observation instrument 20 forms a ground footprint of length L along the direction of travel. As indicated above, the length of the ground footprint can vary with the incidence of optical line of sight 21 on the surface of Earth 80, and length L corresponds to the minimum length of the ground footprint, which is obtained with nadir pointing of optical line of sight 21. Length L obtained with nadir pointing (and at perigee of the orbit in the case of an elliptical orbit) is considered to be the (minimum) reference length for the ground footprint. However, image acquisitions are not necessarily carried out with nadir pointing and can be carried out with any pointing.

In addition, observation instrument 20 is associated with a predetermined spatial resolution $R_s$. Conventionally, the spatial resolution corresponds to the size, for example in meters, of the smallest object which can be detected in a scene represented by an image acquired by observation instrument 20. Also, the smaller the size of the smallest detectable object, the greater the spatial resolution. For example, if the spatial resolution is equal to 0.5 meters (m), then the smallest element on the surface of Earth 80 that a sensor pixel can represent has an area of 0.25 m². Nothing excludes considering other spatial resolution values. Preferably, the spatial resolution $R_s$ is less than two meters (2 m), or even less than one meter (1 m). As for length L, the spatial resolution can vary with the incidence of optical line of sight 21 on the surface of Earth 80. Spatial resolution $R_s$ corresponds here to the spatial resolution of observation instrument 20 that is obtained with nadir pointing (and at perigee of the orbit in the case of an elliptical orbit). Spatial resolution $R_s$ is less than length L and is preferably significantly less than length L, for example by a factor of at least 5,000, or even at least 10,000.

Satellite 10 also comprises a laser transmission module 30 for transmitting data in the form of laser radiation. The data to be transmitted in the form of laser radiation comprises in particular images of the surface of Earth 80 which have been acquired by observation instrument 20. These data are transmitted to a laser reception module 40, which is located in a ground station on the surface of Earth 80 in the non-limiting example of FIG. 1. Of course, several laser reception modules 40 may be provided, for example distributed over the surface of Earth 80 in order to increase the opportunities for transferring data to the ground. The link between laser transmission module 30 and a laser reception module 40 is generally referred to as a "laser link".

In a manner that is known per se, laser transmission module 30 comprises a source of laser radiation and a means adapted to modulate the laser radiation according to the data to be transmitted.

Laser transmission module 30 is associated with a laser line of sight 31 that is fixed in the satellite frame of reference, similarly to optical line of sight 21. In addition, optical 21 and laser 31 lines of sight are related in that laser transmission module 30 is integrated into observation instrument 20, so that laser transmission module 30 uses all or part of the optics of observation instrument 20. For example, laser transmission module 30 is located in the focal plane PF of observation instrument 20, as is sensor array 24. Other non-limiting examples are also described below. It should be noted that optical lines of sight 21 and 31 may be different from each other, or coincident with each other, depending on the examples.

FIG. 2 schematically represents the main steps of a method 50 for acquiring images of the surface of Earth 80.

As illustrated in FIG. 2, the acquisition method 50 mainly comprises two distinct phases:

an acquisition phase P50 comprising a step S50 of acquiring an image of part of the surface of Earth 80, by means of sensor array 24 of observation instrument 20 (part a of FIG. 1), a transmission phase P51 comprising a step S51 of transmitting data by means of laser transmission module 30, to a laser reception module 40 (part b of FIG. 1), the transmitted data comprising at least one image acquired by sensor array 24 of observation instrument 20.

The acquisition method 50 comprises at least one acquisition phase P50 and at least one transmission phase P51. Typically, several acquisition phases P50 are executed in order to acquire several respective images, and some or all of the images acquired during these acquisition phases are transmitted during a transmission phase P51. As satellite 10 advances in its moving orbit, the acquisition method 50 therefore comprises the alternating of one or more acquisition phases P50 and one or more transmission phases P51.

As optical line of sight 21 and laser line of sight 31 of laser transmission module 30 are fixed in the satellite frame of reference, the pointing of optical line of sight 21 of sensor array 24 towards a part of the surface of the Earth to be imaged 80 (acquisition phase P50) or the pointing of laser line of sight 31 of laser transmission module 30 towards a laser reception module 40 (transmission phase P51) is done by controlling the attitude of satellite 10.

During acquisition phases P50 and transmission phases P51, the attitude of satellite 10 is controlled according to a setpoint on the surface of Earth 80 that is predetermined for the current acquisition or transmission phase. Starting from this setpoint, the attitude control comprises, whether it concerns an acquisition phase P50 or a transmission phase P51:

a pointing modification step S60 during which the attitude of satellite 10 is modified so as to orient optical line of sight 21 or laser line of sight 31 towards the setpoint, and a pointing immobilization step S61 during a time interval referred to as an immobilization period during which the attitude of satellite 10 is controlled so that optical line of sight 21 or laser line of sight 31 is kept oriented towards said setpoint during the immobilization period.

Thus, from the point of view of pointing control, the behavior of satellite 10 is the same whether this is an acquisition phase P50 or a transmission phase P51. Pointing control, which is essentially a two-axis attitude control, consists of a succession of pointing modification S60 and pointing immobilization S61 steps, which are executed independently of the type (acquisition or transmission) of the current phase. For example, the pointing control receives, as input (i), the coordinates of the setpoint and (ii) an immobilization period for pointing towards the setpoint. Then the attitude control tilts satellite 10 to point optical 21 or laser 31 line of sight towards the setpoint (step S60) and keeps the pointing stationary during the immobilization period (step S61).

"Keeps stationary" is understood to mean that the satellite's attitude setpoint is determined so as to keep the point targeted by optical line of sight 21 or laser line of sight 31 substantially unmoving on the setpoint, which itself is stationary on the surface of Earth 80, despite the movement of satellite 10. "Substantially unmoving" is understood to mean that the goal of the attitude control is to keep the point targeted by optical line of sight 21 or laser line of sight 31 unmoving, although it may vary slightly during the immobilization period, due for example to attitude control errors and/or measurement noise. Due to such pointing control, it is understood that the incidence of optical line of sight 21 and laser line of sight 31 on the surface of Earth 80 varies during the immobilization period. For example, if the incidence of optical 21 or laser 31 line of sight is substantially normal to the surface of Earth 80 at the start of the pointing immobilization time interval, then the incidence of said optical 21 or laser 31 line of sight on said surface of Earth 80 will be slightly oblique at the end of the time interval, to compensate for the movement of satellite 10. Thus, the given attitude setpoint varies during this time interval (during the immobilization period) and aims in particular to stop the advancement of the optical 21 and laser 31 lines of sight on the ground.

The setpoint of an acquisition phase P50 is such that the ground footprint of the field of view of observation instrument 20 is coincident with a part for which an image is to be acquired. The setpoint of a transmission phase P51 corresponds to the position of a laser reception module 40. The attitude setpoint is therefore determined as a function of the position of satellite 10 in its orbit, the position of the setpoint, and the direction of the optical 21 or laser 31 line of sight in the satellite frame of reference.

As indicated above, pointing control is essentially a two-axis attitude control aimed at orienting optical 21 or laser 31 line of sight towards a setpoint. However, the attitude of satellite 10 is controlled along three axes. In particular, during each acquisition phase P50 and simultaneously with pointing immobilization step S61, the attitude of satellite 10 is also controlled so as to keep the ground footprint of the field of view of observation instrument 20 rotationally stationary around the setpoint during the immobilization period.

The immobilization period of an acquisition phase P50 must allow acquiring an image of the part concerned, at a desired level of quality. It should be noted that image acquisition step S50 is executed during the pointing immobilization time interval (step S61), and that image acquisition step S50 is shorter than or equal to the immobilization period. The immobilization period of a transmission phase P51 must allow transferring a predetermined amount of data to laser reception module 40. It should be noted that data transmission step S51 is executed during the pointing immobilization time interval (step S61), and that data transmission step S51 is shorter than or equal to the immobilization period.

In preferred modes of implementation, the immobilization period is greater than $R_s/V_{sol}$ for each acquisition phase P50.

Such arrangements are particularly advantageous. Indeed, the fact that the point targeted by optical line of sight 21 remains stationary during the immobilization period makes it possible to avoid any blurring. Furthermore, if the acquisition period da (duration of acquisition step S50) is also greater than $R_s/V_{sol}$, then this makes it possible to perform an acquisition having a good signal-to-noise ratio. For example, ratio $R_s/V_{sol}$ is approximately equal to 70 microseconds (µs). Preferably, the immobilization period α of an acquisition phase P50 is between 200 milliseconds (ms) and 1 second(s). The acquisition period $\alpha_a$ is less than or equal to the immobilization period α, for example less than 200 ms.

In the remainder of the description, the terrestrial area Z to be acquired is assumed to be of size T along the direction of travel. Here the terrestrial area Z is assumed to correspond to a continuous surface, meaning one piece along the direction of travel. In other words, the remainder of the description does not concern the case where the terrestrial area Z is a combination of disjoint terrestrial sub-areas along the direction of travel. However, it should be noted that nothing prevents one from considering the acquisition of a terrestrial area which has these characteristics, for example by repeated application of an acquisition phase P50 to each of the disjoint sub-areas which constitute said terrestrial area.

It is also assumed that length L of the ground footprint is less than size T along the direction of travel. Such arrangements imply that several acquisition phases (at least two) are necessary for the terrestrial area Z to be entirely acquired, since the ground footprint does not allow acquiring an image representing the entire terrestrial area Z. Terrestrial area Z is by necessity the joining of at least two different parts, represented by at least two images. The images acquired of the different parts are combined to form a final composite image representing the entire terrestrial area Z to be imaged.

In the remainder of the description, $P_i$ designates a part of terrestrial area Z to be acquired by sensor array 24 of observation instrument 20, with i being a positive integer. We also adopt the convention where, if j is strictly greater than i, then part $P_j$ is acquired by observation instrument 20 after part $P_i$.

FIG. 3 schematically represents the main steps of an acquisition method 50 in the case of a successive acquisition of images of two parts $P_1$ and $P_2$ of terrestrial area Z, part $P_2$ being geographically located further along the direction of travel than part $P_1$.

Said two parts $P_1$ and $P_2$ are for example contiguous, meaning that they touch each other without overlapping, or else said parts $P_1$ and $P_2$ at most partially overlap along the direction of travel. When parts $P_1$ and $P_2$ partially overlap, the overlap surface area preferably represents less than 10% of the surface area of the ground footprint for the acquisition of part $P_1$, or even less than 5% of said surface area of the ground footprint for the acquisition of part $P_1$. Preferably, parts $P_1$ and $P_2$ are arranged in the extension of one another, meaning they are not offset relative to one another transversely to the direction of travel. In other examples, parts $P_1$ and $P_2$ may be disjoint.

As illustrated in FIG. 3, acquisition method 50 comprises two successive acquisition phases P50-1 and P50-2, for the acquisition of respective images of part $P_1$ and part $P_2$ of terrestrial area Z by sensor array 24. Acquisition method 50 then comprises a transmission phase P51 for transmitting some or all of the images of parts $P_1$ and $P_2$ over a laser link to a laser reception module 40.

In the remainder of the description, in a non-limiting manner, the immobilization periods a of acquisition phases P50-1 and P50-2 are assumed to be identical. However, in other examples, nothing excludes considering acquisition phases of different immobilization periods α. Immobilization period α is greater than $R_s/V_{sol}$ (preferably significantly greater by a factor of at least 100, or even at least 1000).

During acquisition phase P50-1, pointing modification step S60 aims to point optical line of sight 21 towards a first setpoint which allows making the ground footprint of observation instrument 20 be coincident with part $P_1$, and pointing immobilization step S61 aims to keep optical line of sight 21 oriented towards this first setpoint during immobilization period α.

During acquisition phase P50-2, pointing modification step S60 aims to point optical line of sight 21 towards a second setpoint which allows making the ground footprint of observation instrument 20 be coincident with part $P_2$, and pointing immobilization step S61 aims to keep optical line of sight 21 oriented towards this second setpoint during immobilization period α.

It should be noted that, in this example, pointing modification step S60 of acquisition phase P50-2 consists mainly of modifying the pitch attitude of satellite 10 (for example around a pitch axis perpendicular to an orbit plane of satellite 10). However, in other examples, nothing excludes modifying the pitch and/or roll attitude of satellite 10 during pointing modification step S60 of acquisition phase P50-2, particularly in the case where parts $P_1$ and $P_2$ are disjoint.

Advantageously, pointing modification step S60 of acquisition phase P50-2 is executed during a time interval of duration β, such that the value $V_{sol}\cdot(\alpha+\beta)\cdot1/L$ is less than a value R, R being equal to 3 (R=3), or equal to 2.3 (R=2.3).

Figure 4:
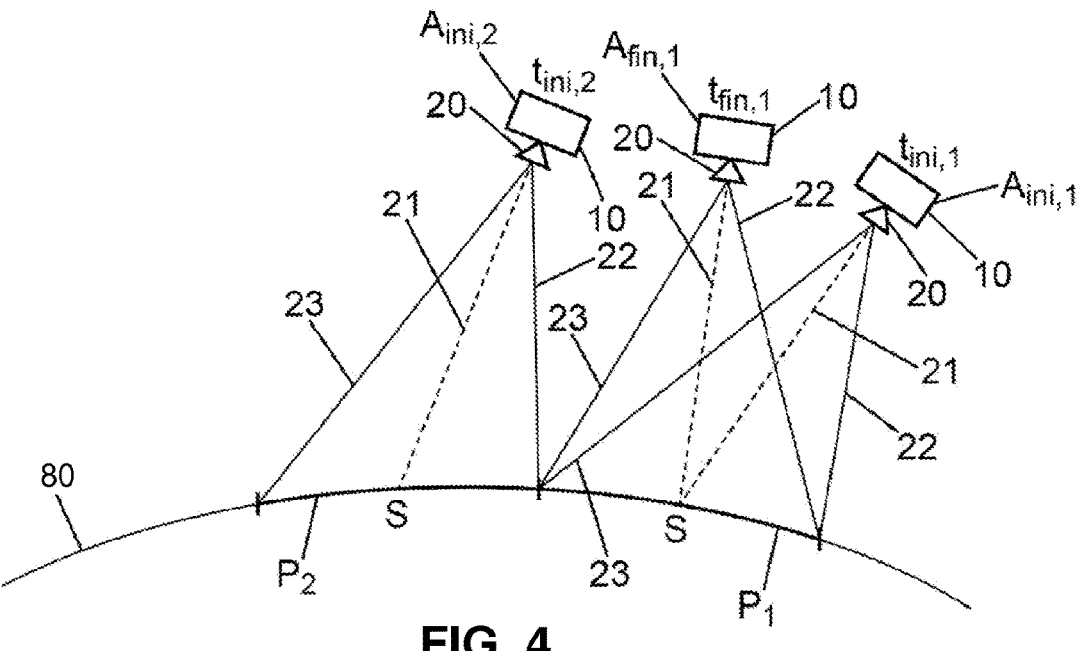
FIG. 4: a schematic representation of the spacecraft during the acquisition of two successive images.

FIG. 4 schematically represents satellite 10 in the process of acquiring parts $P_1$ and $P_2$ of terrestrial area Z, and corresponds to a simplified two-dimensional view resulting from the intersection between Earth 80 and a plane of the orbit of satellite 10.

The example in FIG. 4 is in no way limiting, provided in order to illustrate the operation of acquisition phases P50-1 and P50-2 of acquisition method 50 of FIG. 3.

The field of view of observation instrument 20 is represented in FIG. 1 by a cone delimited by two sides 22, 23 originating from satellite 10. At each moment, these two sides 22, 23 define a footprint on the surface of Earth 80, its length on the ground being substantially equal to L. As for optical line of sight 21, it is represented in FIG. 4 by a dotted line originating from satellite 10 and intersecting the surface of Earth 80 at a point on ground S.

As indicated above, during pointing immobilization step S61 of acquisition phase P50-1, the attitude of satellite 10 is controlled so that the point on ground S targeted by optical line of sight 21 is kept stationary on the surface of Earth 80 for the entire immobilization period $\alpha$, which is greater than $R_s/V_{sol}$. It should be noted that, to the extent that satellite 10 follows a moving orbit and optical line of sight 21 is fixed in the satellite frame of reference, the ground footprint should in principle move with satellite 10, unless there is specific attitude control. The attitude control carried out during pointing immobilization step S61 of acquisition phase P50-1 aims to prevent the ground footprint from moving.

The example in FIG. 4 illustrates the operation of the attitude control carried out during pointing immobilization step S61 of acquisition phase P50-1. In the example illustrated by FIG. 4, satellite 10 is shown three times in its orbit:

a first time at an attitude $A_{ini,1}$, at the start of pointing immobilization step S61 of acquisition phase P50-1, meaning at the start of the time interval of immobilization period $\alpha$, at a time $t_{ini,1}$, a second time at an attitude $A_{fin,1}$, at the end of pointing immobilization step S61 of acquisition phase P50-1, meaning at the end of the time interval of immobilization period $\alpha$, at a time $t_{fin,1}$ ($t_{fin,1}=t_{ini,1}+\alpha$), a third time at an attitude denoted $A_{ini,2}$, at the end of pointing modification step S60 of acquisition phase P50-2, at a time $t_{ini,2}$ ($t_{ini,2}=t_{fin,1}+\beta$).

At attitude $A_{ini,1}$, optical line of sight 21 is oriented so that the footprint corresponds to part $P_1$. As illustrated in FIG. 4, attitude $A_{fin,1}$ has a different pitch than attitude $A_{ini,1}$. However, note that although the respective directions of optical line of sight 21 differ depending on whether the attitude of satellite 10 corresponds to $A_{ini,1}$ or to $A_{fin,1}$, the point on ground S has not moved during the time interval of immobilization period $\alpha$ (between time $t_{ini,1}$ and time $t_{fin,1}$), due to the attitude control which keeps the point on ground S targeted for the duration of pointing immobilization step S61.

If the attitude of satellite 10 has not changed at the end of pointing immobilization step S61 of acquisition phase P50-1, the direction of optical line of sight 21 would remain substantially parallel to the direction presented at the end of the acquisition of part $P_1$. However, maintaining this direction of optical line of sight 21 would delay the acquisition of part $P_2$, because it would then be necessary to wait for satellite 10 to move sufficiently in its orbit for the ground footprint to correspond to part $P_2$.

The aim of pointing modification step S60 of acquisition phase P50-2 is specifically to orient optical line of sight 21, immediately after completing acquisition phase P50-1, so that the ground footprint corresponds to part $P_2$. In addition, pointing modification step S60 is executed during a time interval of duration $\beta$, consecutive to the time interval of immobilization period $\alpha$ of acquisition phase P50-1, such that the value $V_{sol} \cdot (\alpha+\beta) \cdot 1/L$ is less than R.

The target goal in pointing modification step S60 of acquisition phase P50-2 is therefore to place the ground footprint over part $P_2$ as quickly as possible, in order to be able to begin the acquisition of part $P_2$ as soon as possible. This pointing modification preferably must be carried out quickly enough to partly compensate for the time spent observing part $P_1$, and therefore not compromise the completion of the observation mission. "Compromise the completion of the observation mission" refers here to not being able to carry out as many acquisitions as desired, and therefore ultimately not being able to image terrestrial area Z in its entirety.

For the remainder of the description, we introduce the concept of relative delay, this being the ratio between the ground distance traveled by satellite 10 between the start of the pointing immobilization over part $P_1$ and the start of the pointing immobilization over part $P_2$, and the length L. Note that said relative delay exactly corresponds to the value $V_{sol} \cdot (\alpha+\beta) \cdot 1/L$. Consequently, the concept of relative delay aims to quantify a delay of satellite 10 in its orbit by taking into account not only the immobilization period $\alpha$ but also the duration $\beta$ necessary for the pointing modification maneuvers. Equivalently, the concept of relative delay allows quantifying the working portion of the mission devoted to the observation of part $P_1$ compared to the non-working portion of the mission, before starting the observation of part $P_2$, devoted to the maneuvers necessary to modify the attitude of satellite 10 for the purposes of the upcoming acquisition of part $P_2$.

It is therefore understood that a relative delay value strictly greater than 1 indicates that satellite 10 is falling behind during the overall time period required to execute pointing immobilization step S61 of acquisition phase P50-1 and pointing modification step S60 of acquisition phase P50-2. Such a delay is for example linked to the fact that once pointing immobilization step S61 of acquisition phase P50-1 has been executed for a sufficiently long immobilization period $\alpha$, duration $\beta$ of pointing modification step S60 of acquisition phase P50-2 is not short enough to compensate for the time spent acquiring the image of part $P_1$. In the present case, the relative delay is less than R. Although this value is greater than 1, it is sufficiently low not to compromise the observation mission, since it is still possible to acquire several successive parts along the direction of travel. In the case where one wishes to acquire a terrestrial area Z comprising at least one strip of very long length, typically on the order of several hundred kilometers, the value $V_{sol} \cdot (\alpha+\beta) \cdot 1/L$ is for example less than 2.3.

More generally, the terrestrial area Z may be composed of a number N of parts $P_i$ to be acquired successively, N being greater than or equal to two. Thus, acquisition method 50 comprises N successive acquisition phases P50-$i$ which can be such that any pair of successive acquisition phases P50-$i$ and P50-(i+1) is in accordance with the pair of acquisition phases P50-1 and P50-2 described above. Where applicable, pointing modification step S60 of an acquisition phase P50-(i+1) does not necessarily correspond to a change of pitch attitude, but can correspond to a change in roll attitude (for example around a roll axis collinear with a speed vector of satellite 10 in the inertial frame of reference) or to a change of both the roll and pitch attitude, depending on the position of part $P_{i+1}$ relative to part $P_i$. However, immobilization period $\alpha$ and/or duration $\beta$ may vary from one acquisition phase to another.

FIG. 5 schematically represents examples of possible geographical distributions of parts $P_1$ to $P_N$ to be acquired within a terrestrial area Z.

Part a) of FIG. 5 schematically represents an example in which parts $P_i$ are arranged so that, regardless of the value of i, part $P_{i+1}$ is always located further ahead than part $P_i$ along the direction of travel. In this non-limiting example, part $P_{i+1}$ is contiguous with part $P_i$ regardless of the value of i, and is also arranged in the extension of part $P_i$. As indicated above, it is also possible to provide a partial overlap between parts $P_{i+1}$ and $P_i$, for example an overlap of less than 10% or even less than 5%. Such an overlap makes it possible in particular to facilitate registration between the different images. Image "registration" refers here to coherently aligning said parts $P_i$ and $P_{i+1}$ during the reconstruction of the composite image of terrestrial area Z. The image processing techniques used to implement such registration of two images are known to those skilled in the art.

Part b) of FIG. 5 schematically represents an example in which part $P_{i+1}$ is not necessarily located geographically further ahead of part $P_i$ along the direction of travel. In this non-limiting example, part $P_2$ is contiguous to part $P_1$ transversely to the direction of travel, and furthermore is arranged in the extension of part $P_1$. Part $P_3$ is contiguous to part $P_2$ along the direction of travel, and is also arranged in the extension of part $P_2$. Part $P_4$ is contiguous to part $P_3$ transversely to the direction of travel, and is further arranged in the extension of part $P_3$. Part $P_4$ is also contiguous to part $P_1$ along the direction of travel, and furthermore is arranged in the extension of part $P_1$. As indicated above, it is also possible to provide a partial overlap between parts $P_{i+1}$ and $P_i$.

Parts c) and d) of FIG. 5 schematically represent other examples of possible geographical distributions of parts $P_1$ to $P_N$ to be acquired inside terrestrial area Z, in which part $P_{i+1}$ is not necessarily located geographically further ahead of part $P_i$ along the direction of travel.

In preferred modes of implementation, each pointing immobilization step S61 comprises a pointing stabilization of satellite 10 prior to acquiring an image or transmitting one or more acquired images.

Indeed, changing the pointing of satellite 10, preferably carried out very quickly, is likely to create residual vibrations of said satellite 10, and consequently also in optical line of sight 21 or laser line of sight 31. Furthermore, the attitude measurements or estimates of satellite 10 can be very noisy immediately after a pointing modification step S60. Consequently, in such a case, it is not possible to begin the image acquisition or data transmission at the very start of pointing immobilization step S61, and it is appropriate first to stabilize the pointing of satellite 10. The stabilization period, included in the immobilization period and before the acquisition period da (acquisition phase P50) or the transmission period (transmission phase P51), is for example between 100 ms and 800 ms.

FIG. 6 schematically represents an example implementation of a satellite 10 for carrying out acquisition method 50.

As illustrated by FIG. 6, satellite 10 comprises two solar generators 12, 13 arranged on respective opposite faces of a body 11 of satellite 10. Observation instrument 20 is arranged on a face which connects said faces which carry solar generators 12, 13.

Satellite 10 also comprises attitude control means (not shown in the figures) for controlling satellite 10 along three axes, such as inertial actuators. Said attitude control means in particular have a pitch torque formation capacity $C_t$ and a roll torque formation capacity $C_r$. In other words, $C_t$ (respectively $C_r$) corresponds to the maximum value that a pitch (respectively roll) torque formed by the attitude control means of satellite 10 can take.

In addition, the pitch inertia of satellite 10 is designated $I_t$ and the roll inertia of satellite 10 is designated $I_r$.

Satellite 10 further comprises a processing circuit (not shown in the figures) which controls the operation of observation instrument 20, laser transmission module 30, and the attitude control means. The processing circuit comprises for example one or more processors, and storage means (magnetic hard disk, electronic memory, optical disk, etc.) in which a computer program product is stored in the form of a set of program code instructions to be executed in order to implement the various steps of acquisition method 50. Additionally or alternatively, the processing circuit comprises one or more programmable logic circuits (FPGA, PLD, etc.), and/or one or more dedicated integrated circuits (ASIC, etc.), and/or a set of discrete electronic components, etc., suitable for carrying out some or all of said steps of acquisition method 50.

In other words, the processing circuit corresponds to means configured in software (specific computer program product) and/or hardware (FPGA, PLD, ASIC, discrete electronic components, etc.) to perform some or all of the steps of acquisition method 50, via appropriate control of observation instrument 20, laser transmission module 30, and the attitude control means.

It should be noted that satellite 10 may conventionally also comprise other elements such as sensors (star sensor, gyroscope, etc.), which can also be connected to the processing circuit and which are beyond the scope of this invention.

As indicated above, for a given circular (or elliptical) orbit and for a predetermined immobilization period $\alpha$ that is sufficiently long for an image capture of sufficient quality in terms of acquisition period (SNR) and stabilization period, the main parameters which make it possible to ensure that the value $V_{sol}\cdot(\alpha+\beta)\cdot 1/L$ is less than R are mainly the length L of the ground footprint and, for parts arranged along the direction of travel, the ratio $C_t/I_t$. In particular, the value $V_{sol}\cdot(\alpha+\beta)\cdot 1/L$ decreases when the ratio $C_t/I_t$ increases and/or when the length L increases.

Considering that sensor array 24 of observation instrument 20 comprises $N_p$ acquisition cells (pixels) along the direction of travel, then the number $N_p$ is preferably greater than 1000, or even greater than 5000 or 10,000. If we consider a spatial resolution $R_s$ on the order of 0.5 m, then this corresponds to a length L that is greater than 500 m, or even greater than 2.5 km or 5 km.

Additionally or alternatively, ratio $C_t/I_t$ is preferably greater than 0.01 $s^{-2}$, or even greater than 0.018 $s^{-2}$. For example, the pitch torque formation capacity $C_t$ is greater than 0.8 Newton-meter (N·m) and the pitch inertia $I_t$ is less than 80 kg·m². In preferred embodiments, the pitch torque formation capacity $C_t$ is greater than 1 N·m and the pitch inertia $I_t$ is less than 60 kg·m².

By considering a satellite 10 having a high ratio $C_t/I_t$ and an observation instrument 20 having a ground footprint of long length L, it is possible to have image acquisition times $\alpha_a$ that are sufficiently long for quality image capture, while compensating for the delay caused by the rapid maneuvers between successive acquisitions. In particular, it is possible to acquire a terrestrial area Z comprising at least one strip of a length greater than 10 km, or even greater than 100 km, obtained by acquiring images of at least 3 parts, or even many more, arranged to lie in the extension of one another along the direction of travel of satellite 10. If we consider a satellite 10 having a high ratio $C_r/I_r$, it is also possible to quickly perform the pitch maneuver of pointing modification step S60 of a transmission phase P51, which makes it possible to begin transmitting data to a laser reception module 40 as early as possible. It should be noted that everything that has been said above for pitch capacity $C_t$ and ratio $C_t/I_t$ is also applicable for roll capacity $C_r$ and ratio $C_r/I_r$.

In preferred embodiments, the attitude control means comprise at least one reaction wheel which recovers electrical energy. Preferably, all the inertial actuators used during pointing modification step S60 are reaction wheels which recover electrical energy. Such reaction wheels which recover electrical energy are known from patent application EP 2247505 A1.

The use of reaction wheels which recover electrical energy is particularly advantageous for the following reasons. First of all, it should be noted that in order to provide a high pitch (respectively roll) torque capacity (greater than 0.8 N·m or even greater than 1 N·m) by means of reaction wheels, it is necessary to use fairly massive reaction wheels, which tends to increase the pitch inertia $I_t$ (respectively $I_r$) of satellite 10. However, with reaction wheels which recover electrical energy, in particular as described in patent application EP 2247505 A1, it is possible to reduce the mass required at equivalent torque capacity compared to reaction wheels which do not recover electrical energy. In addition, because the reaction wheels recover electrical energy, the electrical energy requirements of satellite 10 are reduced. In particular, it is possible to reduce the dimensions and mass of solar generators 12, 13, which makes it possible to reduce the inertia of satellite 10. Thus, the increase in mass that may be required in order to have significant torque capacity (although less with reaction wheels which recover electrical energy than with reaction wheels which do not recover electrical energy) can be offset at least in part by a reduction in the mass and dimensions of solar generators 12, 13.

In some particular embodiments, the attitude control means comprise at least one control moment gyroscope (CMG). Preferably, all the inertial actuators made use of in pointing modification step S60 are control moment gyroscopes. However, it is possible to combine different types of inertial actuators, such as control moment gyroscopes and reaction wheels.

The use of control moment gyroscopes is particularly advantageous because they have a high ratio of torque capacity to mass. It is thus possible to have a high pitch torque capacity without adversely affecting the pitch inertia $I_t$ of satellite 10.

As indicated above, observation instrument 20 comprises at least one sensor array 24, for example of the CMOS type (acronym for "Complementary Metal-Oxide Semiconductor"). However, it should be noted that observation instrument 20 may comprise several sensor arrays 24. For example, several sensor arrays may be used to acquire images in different respective wavelengths (red, green, blue, near infrared, etc.), etc.

In preferred embodiments, observation instrument 20 comprises a Bayer filter. A Bayer filter, in a manner that is known per se, makes it possible to acquire red, green, and blue (RGB) color images in different respective wavelengths with a same sensor array 24. Such arrangements make it possible to simplify observation instrument 20.

In addition to one or more sensor arrays 24, observation instrument 20 may comprise other elements, for example such as optics comprising one or more mirrors, one or more lenses, a support structure, electronic components, etc. In preferred embodiments, the optics of observation instrument 20 comprise at least two mirrors that are fixed in the spacecraft frame of reference, and laser transmission module 30 transmits laser radiation along laser line of sight 31 via least two mirrors of the optics of observation instrument 20. Thus, while the mirrors are utilized to successively reflect an optical flow received from the surface of Earth 80 towards sensor array 24, some or all of these mirrors are also used to reflect, in the opposite direction, the laser radiation transmitted by laser transmission module 30. Sensor array 24 and laser transmission module 30 are therefore structurally linked to each other, and are therefore subject to the same pointing errors. They can be viewed as corresponding to the same piece of equipment for pointing control operations.

Figure 7:
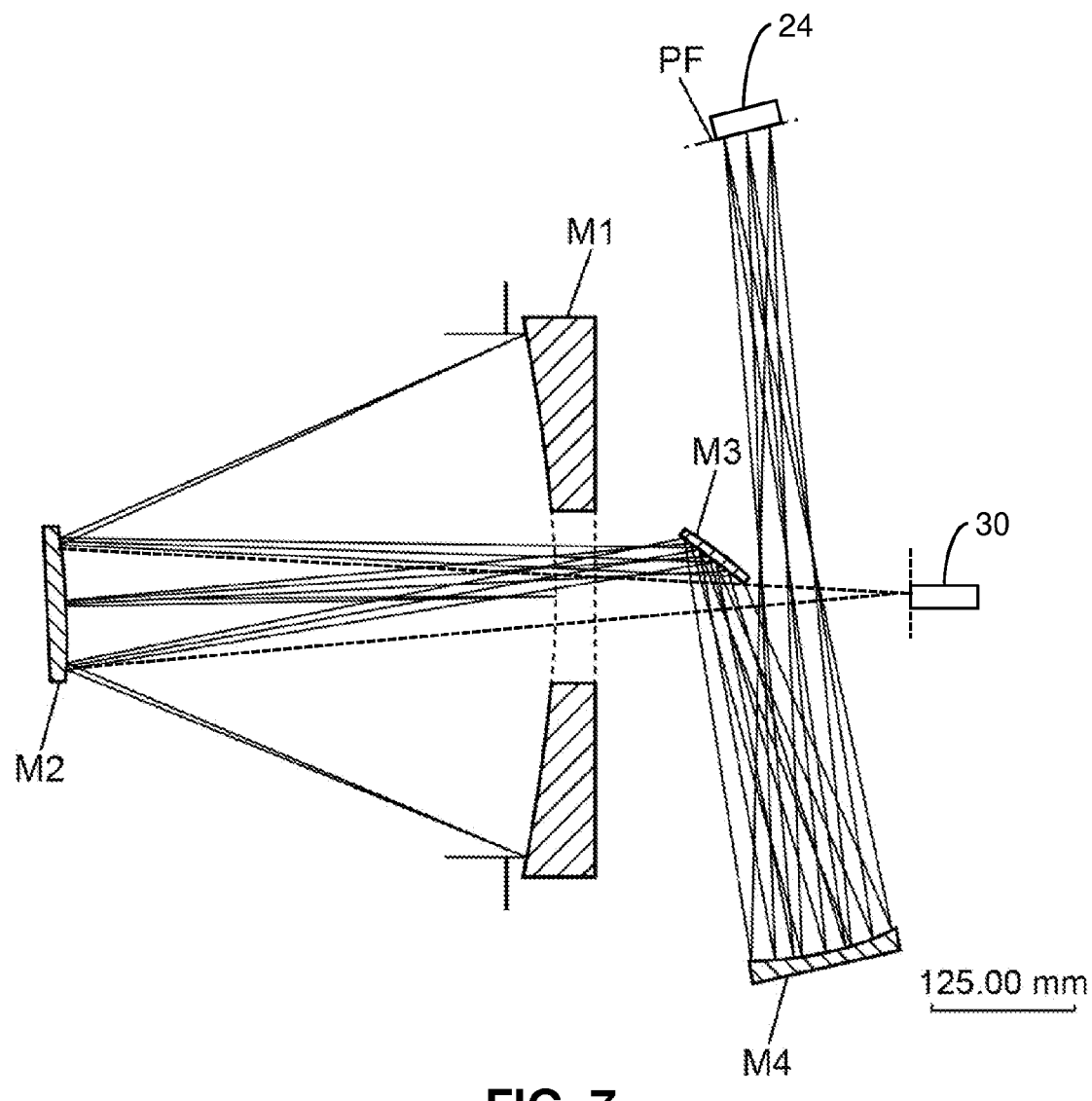
FIG. 7: a representation of a section view of a first exemplary embodiment of an observation instrument and a laser transmission module.
Figure 8:
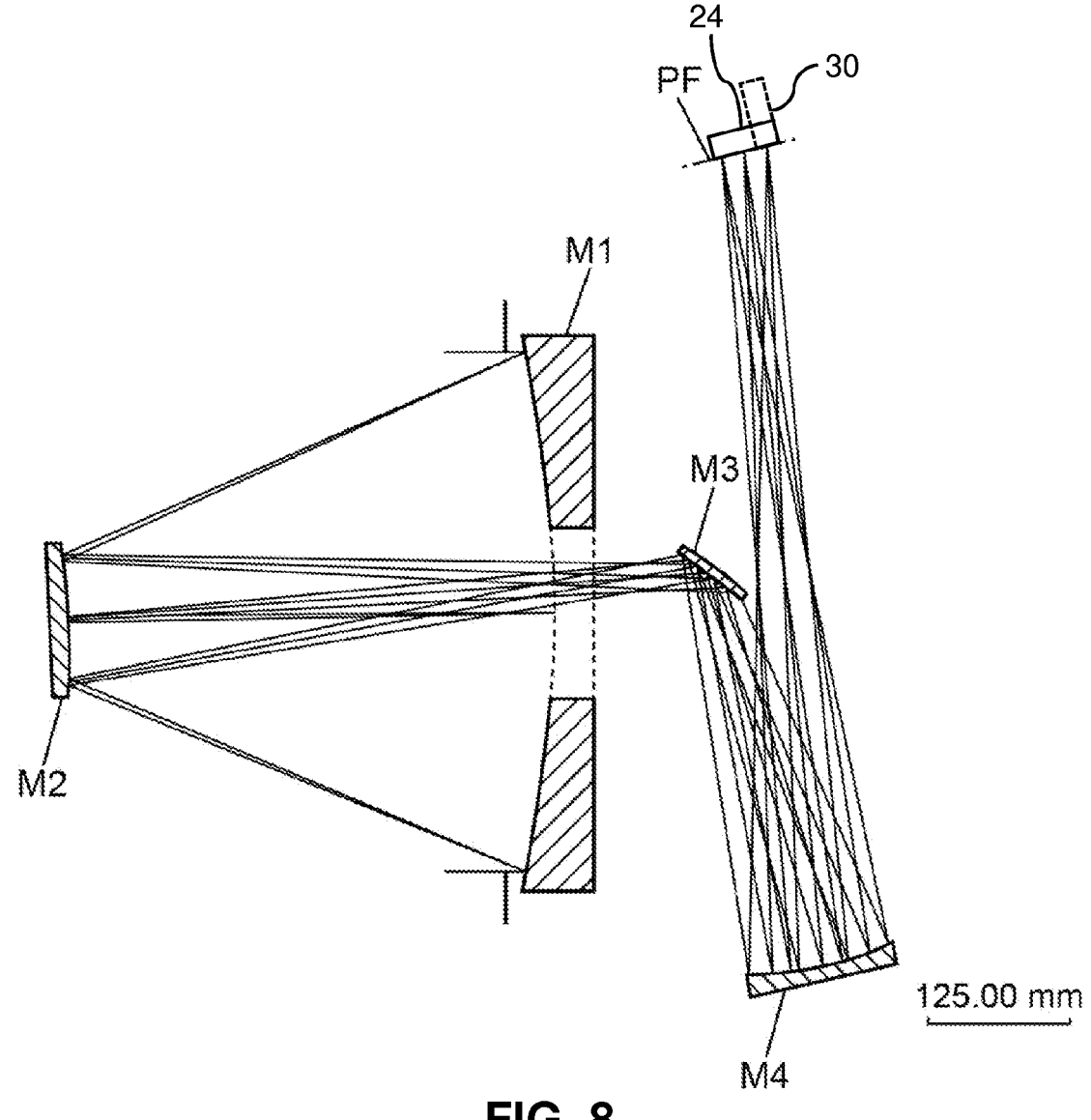
FIG. 8: a representation of a section view of a second embodiment of the observation instrument and the laser transmission module.
Figure 9:
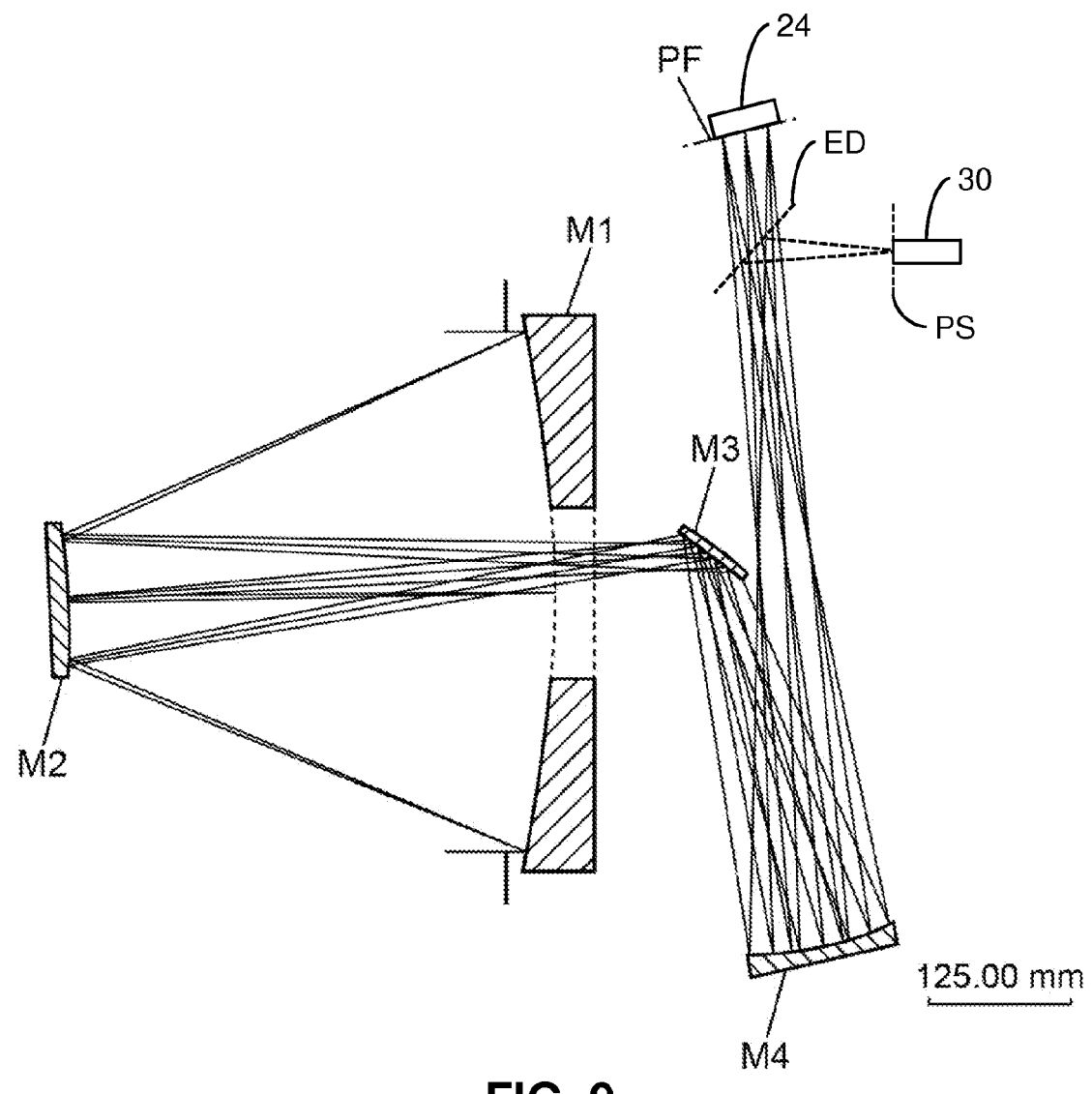
FIG. 9: a representation of a section view of a third embodiment of the observation instrument and the laser transmission module.

FIGS. 7 to 9 represent non-limiting examples of embodiments in which mirrors of the optics of observation instrument 20 are used by laser transmission module 30. It should be noted that FIGS. 7 to 9 are represented to scale, but only for the various mirrors and their respective positions.

In FIGS. 7 to 9, the optics of observation instrument 20 are of the Korsch type, which allows for great compactness as well as low mass, with a high focal length. As illustrated in FIGS. 7 to 9, the Korsch optics comprise a 480 mm mirror M1, a 160 mm mirror M2, a folding mirror M3, and a mirror M4. The incident optical flow is therefore successively reflected by mirror M1, mirror M2 (through mirror M1), folding mirror M3, and mirror M4, until reaching the focal plane PF where sensor array 24 of observation instrument 20 is located.

With such Korsch optics, it is possible to design an observation instrument weighing around 80 kg, carried in a satellite weighing around 300 kg. The focal plane can comprise for example one or more sensor arrays, each sensor array comprising 14192×10140 acquisition cells (pixels), for example according to the IMX 411 model marketed by Sony®. For a satellite orbiting at an altitude of 500 km, this allows achieving a resolution of 0.5 m, with a length L of 5 km. For example, body 11 of the satellite has dimensions of 1.53×1.14×1.0 m. Two solar generators 12, 13 of 1 m² provide power of 250 W which is sufficient for the needs of the satellite. Due to this compactness, the inertias $I_{xx}$, $I_{yy}$, $I_{zz}$ along the three axes X, Y, Z of the satellite frame of reference are low: $(I_{xx}, I_{yy}, I_{zz})=(57, 76, 77)$ kg·m². In orbit, the attitude of satellite 10 is for example controlled around a reference attitude in which the X axis is collinear with the roll axis and the Y axis is collinear with the pitch axis, in which case the inertias $I_{xx}$ and $I_{yy}$ respectively correspond to the roll inertia $I_r$ and to the pitch inertia $I_t$.

In the example illustrated in FIG. 7, laser transmission module 30 is facing towards mirror M2, in an intermediate focal plane associated with mirrors M1 and M2. The laser radiation emitted by laser transmission module 30 is therefore successively reflected by mirror M2 then by mirror M1, from which it is reflected along laser line of sight 31.

In the example illustrated by FIG. 8, laser transmission module 30 is located in focal plane PF of observation instrument 20, at a location in focal plane PF which is offset relative to sensor array 24. The laser radiation transmitted by laser transmission module 30 is therefore successively reflected by mirrors M4, M3, M2, and M1 from which it is reflected along laser line of sight 31. In this example, optical lines of sight 21 and 31 by necessity are different from each other.

In the example illustrated by FIG. 9, laser transmission module 30 is located in a secondary focal plane PS, which corresponds to a duplication of focal plane PF of observation instrument 20. For this purpose, a focal plane duplication element ED is arranged on the path of the radiation between focal plane PF and mirror M4. Duplication element ED may comprise a mirror or a dichroic reflector configured to reflect one among the laser radiation from laser transmission module 30 and the optical flow originating from the observed scene, and to transmit without reflection the other among the laser radiation and optical flow. In the example illustrated by FIG. 9, it is the laser radiation which is reflected, so the laser radiation is successively reflected by the duplication element ED and then mirrors M4, M3, M2, and M1. In this example, optical lines of sight 21 and 31 may be coincident.

It should be noted that other configurations are possible for the optics of observation instrument 20, which in particular may comprise a different number of mirrors than the number of mirrors (4) represented in FIGS. 7 to 9. For example, the optics of the observation instrument may comprise two mirrors, for example arranged like mirrors M1 and M2 of FIG. 7, the laser transmission module 30 and sensor array 24 both being for example located in the focal plane of observation instrument 20 (which in this case corresponds to the intermediate focal plane of FIG. 7).

The invention claimed is:

1. A method for acquiring images by using a spacecraft, said spacecraft being in a moving orbit around the Earth, the spacecraft comprising:

an observation instrument associated with a field of view that is fixed in the spacecraft frame of reference, said field of view being defined, around an optical line of sight, by a sensor array located in a focal plane of the optics of the observation instrument, a laser transmission module associated with a laser line of sight that is fixed in the spacecraft frame of reference, said laser transmission module being located in the focal plane or in a secondary focal plane of the optics or in an intermediate focal plane of part of the optics, the laser transmission module being adapted to transmit data comprising images acquired by the sensor array of the observation instrument, to a laser reception module, said method comprising one or more phases of image acquisition by the sensor array of the observation instrument, and a phase of data transmission by the laser transmission module, said transmitted data comprising one or more images acquired by the sensor array of the observation instrument, wherein, during each acquisition phase and each transmission phase, the attitude of the spacecraft is controlled according to a setpoint on the Earth's surface that was predetermined for the acquisition or transmission phase in progress, said attitude control comprising:

a pointing modification step during which the attitude of the spacecraft is modified so as to orient the optical line of sight or the laser line of sight towards the setpoint, a pointing immobilization step during a time interval referred to as the immobilization period, during which the attitude of the spacecraft is controlled so that the optical line of sight or the laser line of sight is kept oriented towards said setpoint during the immobilization period, wherein, the spacecraft having a ground speed Vsol and the observation instrument being associated with a spatial resolution $R_s$ along a direction of travel, the immobilization period is greater than $R_s/V_{sol}$ for each acquisition phase, wherein, a ground footprint of the field of view being of length L along the direction of travel, said method comprises at least two successive phases of acquiring images of two parts $P_1$ and $P_2$ of a terrestrial area Z, wherein the pointing modification step of the image acquisition phase for part $P_2$ is executed during a time interval of duration $\beta$ such that the value $V_{sol} \cdot (\alpha+\beta) \cdot 1/L$ is less than a value R, R being equal to 3, a being the immobilization period of the acquisition phase for part $P_1$.

2. The method according to claim 1, wherein the immobilization period $\alpha$ is between 200 ms and 1 s.

3. The method according to claim 1, wherein the duration $\beta$ is between 1 s and 2 s.

4. The method according to claim 1, comprising, during a same orbital period, at least two image acquisition phases for a same part $P_1$ of a terrestrial area.

5. The method according to claim 1, wherein each pointing immobilization step comprises stabilizing the pointing of the spacecraft prior to acquiring an image or transmitting one or more acquired images.

6. The method according to claim 1, comprising a phase of using the sensor array to acquire an image of a calibration area, referred to as a calibration image, and calibrating the pointing error by comparing the calibration image with reference data associated with said calibration area.

7. A spacecraft intended to be placed in moving orbit around the Earth, comprising:

attitude control means for the spacecraft, an observation instrument associated with a field of view that is fixed in the spacecraft frame of reference, said field of view being defined, around an optical line of sight, by a sensor array located in a focal plane of optics of the observation instrument, a laser transmission module associated with a laser line of sight that is fixed in the spacecraft frame of reference, said laser transmission module being located in the focal plane or in a secondary focal plane of the optics or in an intermediate focal plane of part of the optics, means configured to implement a method for acquiring images according to claim 1.

8. The spacecraft according to claim 7, wherein, said spacecraft having a pitch inertia It and the attitude control means having a pitch torque formation capacity $C_t$, the ratio $C_t/I_t$ is greater than 0.01 s$^{-2}$.

9. The spacecraft according to claim 7, wherein, said spacecraft having a roll inertia $I_r$ and the attitude control means having a roll torque formation capacity $C_r$, the ratio $C_r/I_r$ is greater than 0.01 s$^{-2}$.

10. The spacecraft according to claim 7, wherein the sensor array comprises a number $N_p$ that is greater than 1000, of acquisition cells along a direction of travel of the spacecraft.

11. The spacecraft according to claim 7, wherein the attitude control means comprise at least one reaction wheel which recovers electrical energy and/or at least one control moment gyroscope.

12. The spacecraft according to claim 7, wherein the optics comprise at least two mirrors that are fixed in the spacecraft frame of reference, and the laser transmission module transmits laser radiation along the laser line of sight via at least two mirrors of the optics.

13. The spacecraft according to claim 12, wherein the observation instrument comprises Korsch optics.

* * * * *